US008696476B1

(12) United States Patent
Dial, Jr.

(10) Patent No.: US 8,696,476 B1
(45) Date of Patent: Apr. 15, 2014

(54) METAL STEERING COUPLING SUPPORT DEVICE

(71) Applicant: Johnson Dial, Jr., Lakewood, WA (US)

(72) Inventor: Johnson Dial, Jr., Lakewood, WA (US)

( * ) Notice: Subject to any disclaimer, the term of this patent is extended or adjusted under 35 U.S.C. 154(b) by 0 days.

(21) Appl. No.: 13/717,106

(22) Filed: Dec. 17, 2012

Related U.S. Application Data

(63) Continuation-in-part of application No. 12/869,044, filed on Aug. 26, 2010, now Pat. No. 8,357,053.

(51) Int. Cl.
*F16D 3/48* (2006.01)

(52) U.S. Cl.
USPC ............................................. 464/93; 464/137

(58) Field of Classification Search
USPC ............. 464/51, 57–60, 69, 85, 93–96, 137, 464/138; 29/525.02, 525.04, 525.08, 29/525.09; 403/337
See application file for complete search history.

(56) References Cited

U.S. PATENT DOCUMENTS

| | | | |
|---|---|---|---|
| 176,707 A | 4/1876 | Tasker | |
| 1,190,323 A | 7/1916 | Robert | |
| 1,522,980 A | 1/1925 | Roco et al | |
| 1,615,138 A | 1/1927 | Runyon | |
| 1,643,017 A | 9/1927 | Hufferd | |
| 2,430,449 A * | 11/1947 | Brown | 464/137 X |
| 2,753,702 A | 7/1956 | Dunn | |
| 2,913,884 A | 11/1956 | Pfeifer | |
| 2,998,717 A | 9/1961 | Schwenk | |
| 3,861,172 A | 1/1975 | Symann | |
| D269,111 S | 5/1983 | Logsdon | |
| D278,793 S | 5/1985 | Smith et al. | |
| 4,802,881 A | 2/1989 | Hancock | |
| 6,200,223 B1 | 3/2001 | Martens | |
| 7,322,890 B2 | 1/2008 | Waller | |
| 7,497,781 B2 | 3/2009 | Cunningham et al. | |
| 2003/0030273 A1 | 2/2003 | Shimizu et al. | |
| 2003/0060290 A1 * | 3/2003 | Shimizu et al. | 464/93 |

FOREIGN PATENT DOCUMENTS

| | | | |
|---|---|---|---|
| GB | 1327791 | 8/1973 | |
| GB | 1 500 623 | * 2/1978 | 464/93 |

* cited by examiner

*Primary Examiner* — Gregory Binda

(57) ABSTRACT

A steering coupling support device for use in combination with a standard elastic steering coupling in a vehicle. The device features a generally flat disc having a top surface and a bottom surface. A center aperture is disposed in a center of the disc, and four outer apertures are disposed in the disk outside the center aperture in a symmetrical manner. A coupling is placed between the discs. The coupling is a one-piece coupling having four spread loops and a center loop. The section of each of the four bolts between a first steering coupling support device and a second steering coupling support device resides within each of the said spread loops of the said plastic coupling.

3 Claims, 5 Drawing Sheets

METAL STEERING COUPLING SUPPORT DEVICE

CROSS REFERENCE

This application claims priority to and is a continuation-in-part of U.S. Non-Provisional Application Ser. No. 12/869,044 filed Aug. 26, 2010, now U.S. Pat. No. 8,357,053, the disclosure of which is incorporated herein by reference in its entirety.

FIELD OF THE INVENTION

The present invention is directed to a metal steering coupling support for use in combination with an elastic steering coupling. The present system allows for a safe and controlled stop of the vehicle if and when the plastic steering control device fans.

BACKGROUND OF THE INVENTION

When the elastic steering coupling breaks in a vehicle, a fatal accident usually results. The present invention features a metal steering coupling support device for use in combination with the standard elastic steering coupling in a vehicle. The steering coupling support device of the present invention provides strength to the steering gear coupling, helping to ensure that the steering coupling doesn't fail completely. The steering coupling support device is constructed from metal so it is more durable than the elastic counterpart. This can help save time and money by preventing frequent part replacements.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
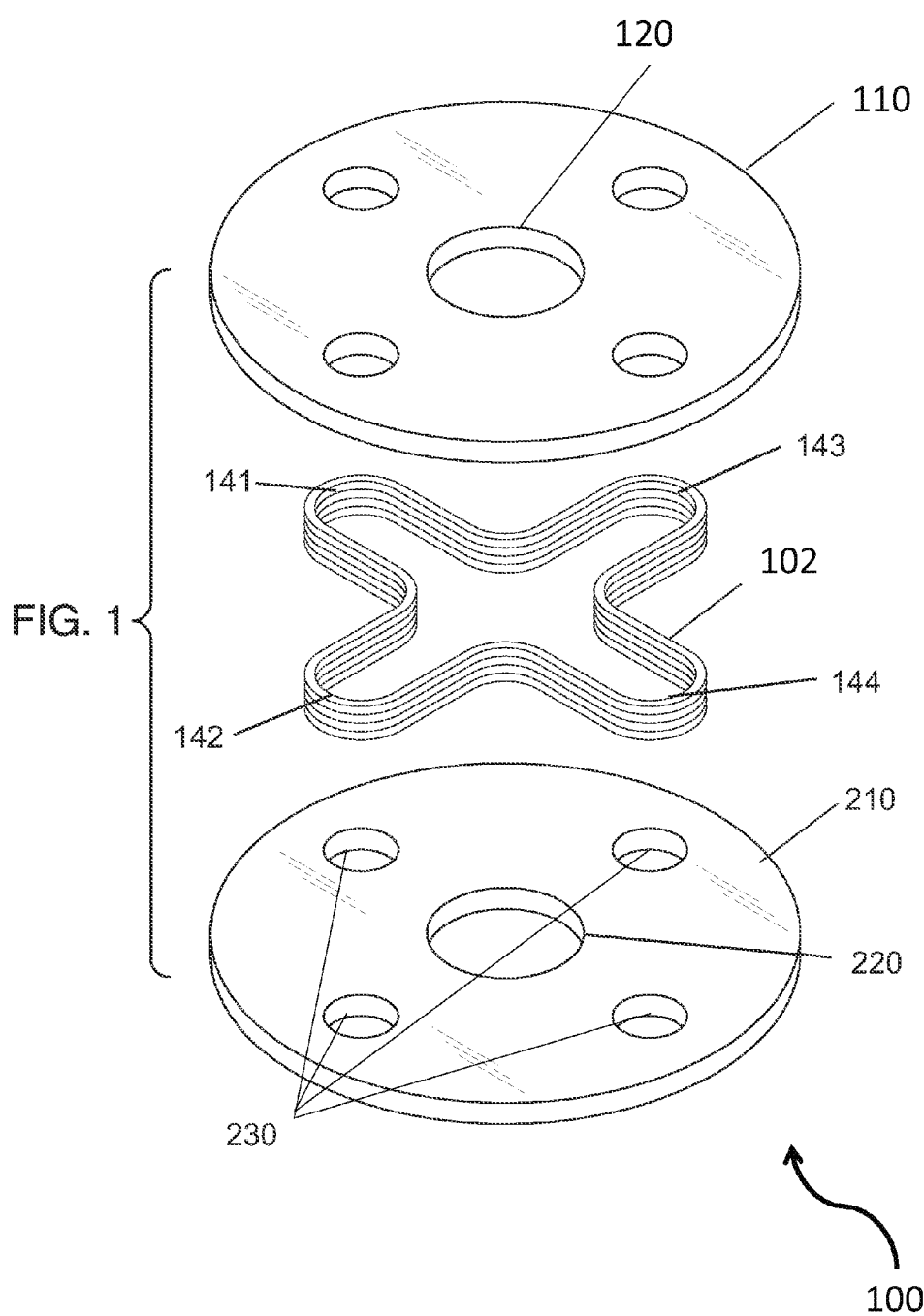
FIG. 1 is a perspective view of two steering coupling support devices 100 sandwiching a plastic shaft coupling 102.
Figure 2:
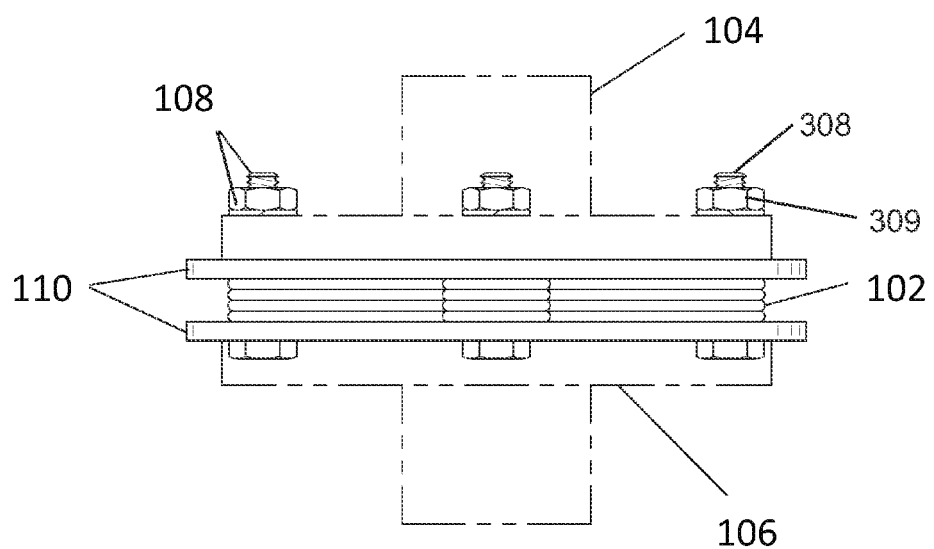
FIG. 2 is a side view of two steering coupling support devices 100 sandwiching a cross-shaped plastic shaft coupling 102. The steering coupling support devices 100 and plastic shaft coupling 102 and sandwiched by an upper flange 104 and a lower flange 106 (secured by mounting hardware 108). The coupling 102 is a continuous loop formed in a cross-shape having four arms 141, 142, 143, and 144, wherein the section of each of the four bolts between a first steering coupling support device and a second steering coupling support device resides within each of the said arm of the said plastic coupling.
Figure 3:
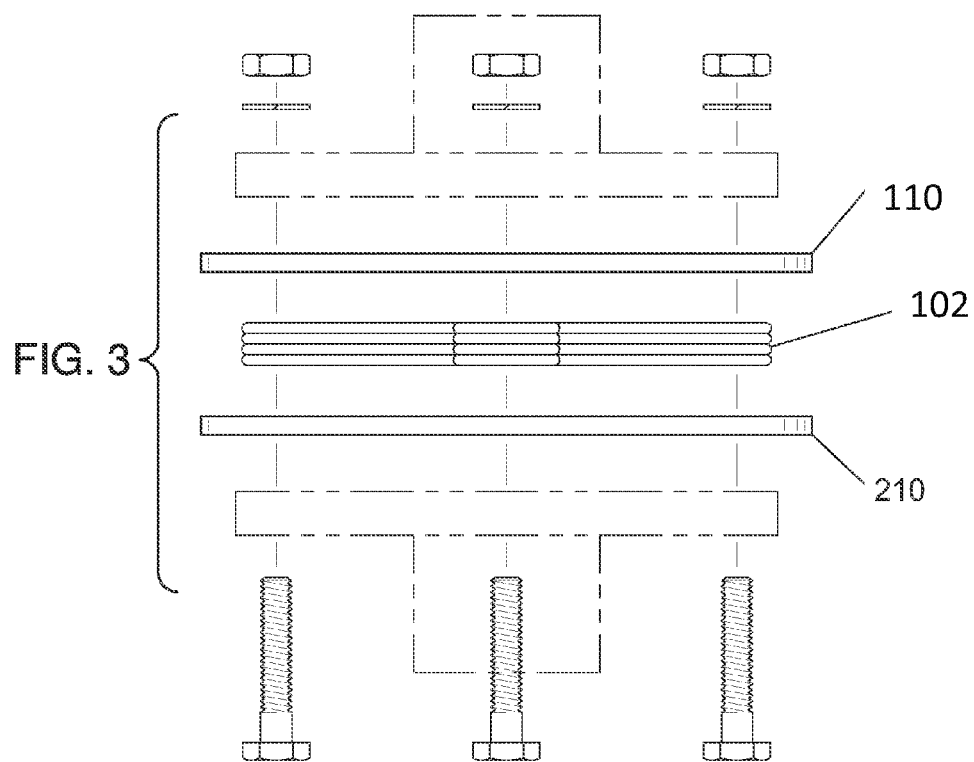
FIG. 3 is a side exploded view of FIG. 2.

Referring now to FIG. 1-5, the present invention features a metal steering coupling support device 100 for use in combination with the standard elastic steering coupling in a vehicle. The support device 100 of the present invention comprises a first steering coupling support device 110 and a second steering coupling support device 210, wherein both steering coupling support devices are generally flat discs having a top surface and a bottom surface; wherein a first center aperture 120 with a first inner diameter 320 disposed in a center of the first steering coupling support device 110, wherein a first set of four outer apertures 130 disposed in the first steering coupling support device 110 outside the first center aperture 120 in a symmetrical manner, wherein a second center aperture 220 disposed in a center of the second steering coupling support device 210, wherein a second set of four outer apertures 230 disposed in the second steering coupling support device 210 outside the second center aperture 220 with a second inner diameter 321 in a symmetrical manner, wherein each steering coupling support device is constructed from a metal.

In some embodiments, the mounting hardware 108 are four bolts 308 securing both coupling device together via the first set of outer apertures and the second set of outer apertures, wherein the said bolts are tightened by nuts 309.

A cross-shaped plastic shaft 102 coupling is sandwiched between the first steering coupling device 110 and the second steering coupling support device 210; wherein the coupling 101 is a continuous loop formed in a cross-shape having a first arm 141, a second arm 142, a third arm 143 and a fourth arm 144, wherein the section of each of the four bolts between the first steering coupling support device 110 and the second steering coupling support device 220 resides within each of the four arms of the cross-shaped plastic coupling 102.

The support device 100 of the present invention comprises an upper flange 104 and a lower flange 106, wherein the first steering coupling support device 110, the second steering coupling support device 210, and the cross plastic shaft coupling device 102 are together sandwiched between the upper flange 104 and the lower flange 104.

The support device 100 of the present invention resembles standard elastic steering couplings, which are well known to one of ordinary skill in the art. The steering coupling support device 100 can be used in combination of or in lieu of standard elastic steering couplings.

Figure 4:
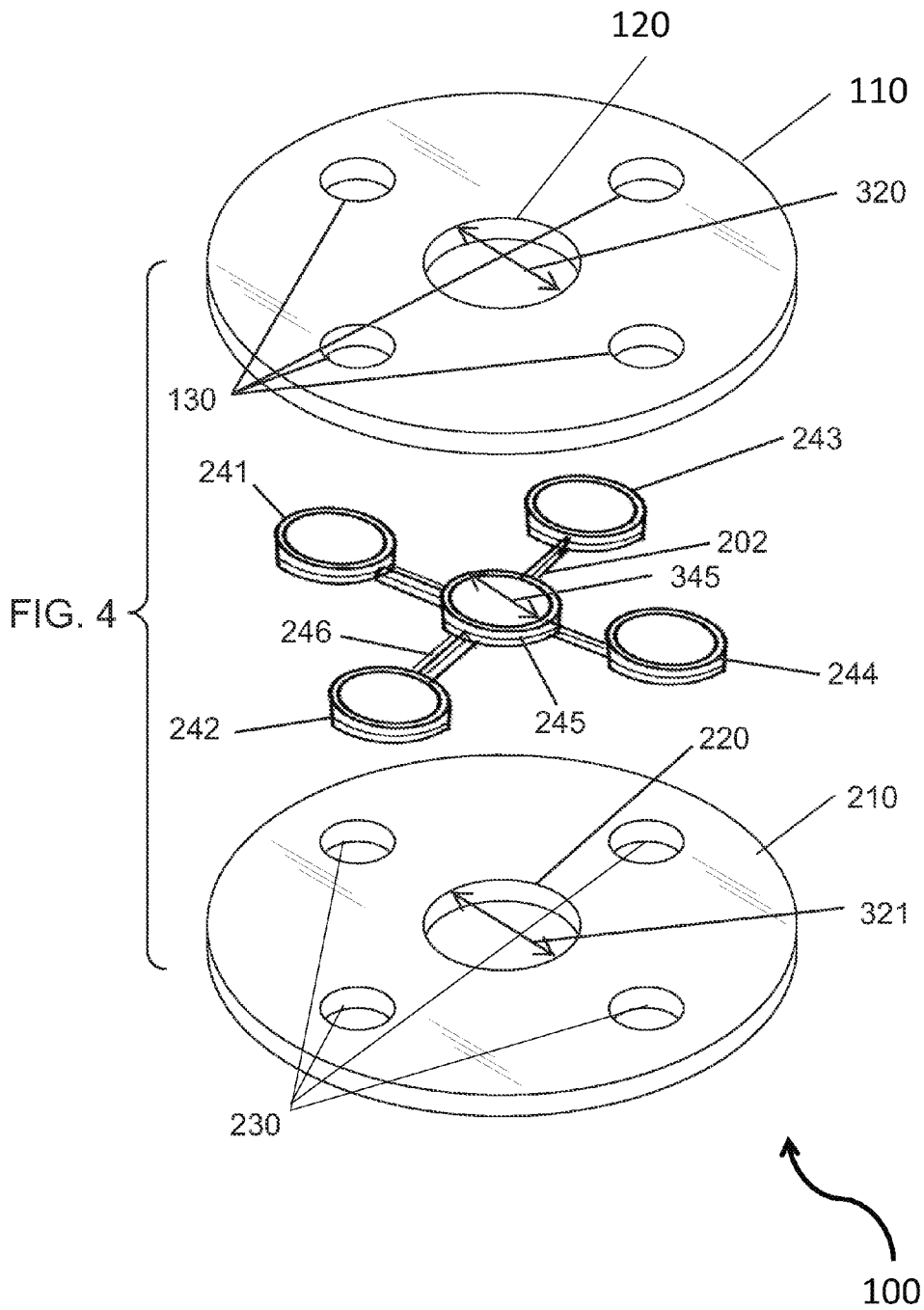
FIG. 4 is a side view of two steering coupling support devices 100 sandwiching a multi-loop coupling 202. The steering coupling support devices 100 and multi-loop coupling 202 and sandwiched by an upper flange 104 and a lower flange 106 (secured by mounting hardware 108).

Referred to FIG. 4, a multi-loop coupling 202 sandwiched between the first steering coupling device 110 and the second steering coupling support device 210; wherein the coupling is a one-piece coupling having a first spread loop 241, a second spread loop 242, a third spread loop 243, a fourth spread loop 244 and a center loop 245, wherein the center loop 245 connects to each of the spread loops via four connection arms 246, wherein the section of each of the four bolts 308 between a first steering coupling support device 110 and a second steering coupling support device 210 resides within each of the said spread loops of the said plastic coupling 202, wherein the center loop 245 has an inner diameter 345 larger than both the first inner diameter 320 and the second inner diameter 321. In some embodiments, the first inner diameter 320 and the second inner diameter 321 are the same and equal to the inner diameter 345 of the center loop 245.

In some embodiments, the first spread loop 241, second spread loop 242, third spread loop 243 and fourth spread loop 244 have the same height 344, wherein the center loop 245 has a height 345 the same as the height 344 of the four spread loops.

In some embodiments, the connection arm 246 is made from the same material from the spread loops. In some embodiments, the connection arm 246 is made from different material from the spread loops. For example, the connection arm can be made of more economic material to save cost because the connection arm are not suffering from mechanical force.

Figure 5:
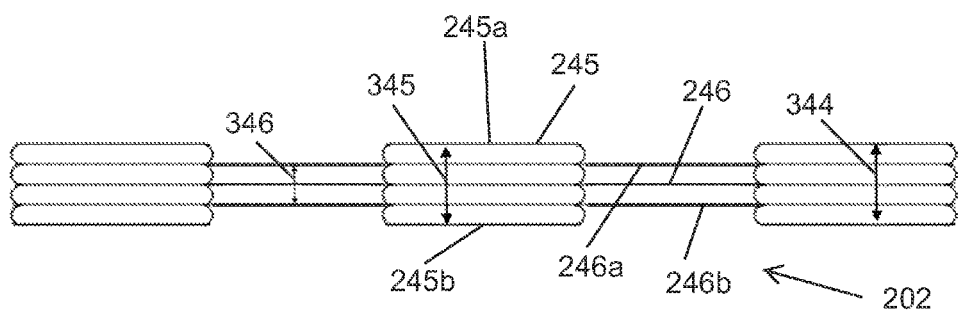
FIG. 5 is a side view of the multi-loop coupling 202.

In some embodiments, the connection arm 246 has a height 346 the same as the height 345 of the center loop 245. In some embodiments, the connection arm 246 has a height 346 smaller than the height 345 of the center loop 245. As shown in FIG. 5, the connection arm 246 has an upper edge 246a and a lower edge 246b. The center loop 245 has an upper edge 245a and a lower edge 245b. The upper edge 246a of each connection arm 246 is lower than the upper edge 245a of the center loop 245. The lower edge 246b of each connection arm 246 is lower than the lower edge 245b of the center loop 245.

The multi-loop coupling 202 is such configured such that the connection arm 246 is free of mechanical pressing force when the plates 110 are bolted together and thus have longer lifespan. Moreover, the coupling 202 is such configured such that if any one of the four spread loops is broken, the remaining of the spread loops are still functioning thus any catastrophic sequence from a single loop breakdown is prevented.

The present invention also features a system comprising a first steering coupling support device and a second steering coupling support device. Each steering coupling support device comprises a generally flat disc having a top surface and a bottom surface, a center aperture disposed in a center of the disc, and four outer apertures disposed in the disk outside the center aperture in a symmetrical manner. Each steering coupling support device is constructed from a metal.

The system further comprises a plastic shaft coupling sandwiched between the first steering coupling device and the second steering coupling support device, and an upper flange and a lower flange. The first steering coupling support device, the second steering coupling support device and the plastic shaft coupling device are together sandwiched between the upper flange and the lower flange (see FIG. 2). The system may be secured together with mounting hardware 108.

The disclosures of the following U.S. Patents are incorporated in their entirety by reference herein: U.S. Pat. Application No. 2003/0030273; U.S. Pat. No. 4,802,881; U.S. Pat. No. 2,913,684; U.S. Pat. No. 2,753,702; U.S. Pat. No. 7,322,890; U.S. Pat. No. 2,998,717; U.S. Design Pat. No. D278,793; U.S. Design Pat. No. D269,111.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A system (100) comprising:
   (a) a first steering coupling support device (110) and a second steering coupling support device (210), wherein both steering coupling support devices are generally flat discs having a top surface and a bottom surface; wherein a first center aperture (120) with a first inner diameter (320) is disposed in a center of the first steering coupling support device (110), wherein a first set of four outer apertures (130) is disposed in the first steering coupling support device (110) outside the first center aperture (120) in a symmetrical manner, wherein a second center aperture (220) is disposed in a center of the second steering coupling support device (210), wherein a second set of four outer apertures (230) is disposed in the second steering coupling support device (210) outside the second center aperture (220) with a second inner diameter (321) in a symmetrical manner, wherein each steering coupling support device is constructed from a metal;
   (b) four bolts (308) securing both coupling device together via the first set of outer apertures and the second set of outer apertures, wherein the said bolts are tightened by nuts (309);
   (c) a multi-loop coupling (202) sandwiched between the first steering coupling device (110) and the second steering coupling support device (210); wherein the coupling is a one-piece coupling having a first spread loop (241), a second spread loop (242), a third spread loop (243), a fourth spread loop (244) and a center loop (245), wherein the center loop (245) connects to each of the spread loops via four connection arms (246), wherein the section of each of the four bolts (308) between the first steering coupling support device (110) and the second steering coupling support device (210) resides within each of the said spread loops of the said plastic coupling (202), wherein the center loop (245) has an inner diameter (345) larger than both the first inner diameter (320) and the second inner diameter (321), wherein the first spread loop (241), second spread loop (242), third spread loop (243) and fourth spread loop (244) have the same height (344), wherein the center loop (245) has a height (345) the same as the height (344) of the four spread loops; and
   (d) an upper flange (104) and a lower flange (106), wherein the first steering coupling support device (110), the second steering coupling support device (210), and the multi-loop device (202) are together sandwiched between the upper flange (104) and the lower flange (104);

wherein the connection arms (246) are made from different material from the spread loops.

2. The system of claim 1, wherein the connection arm has a height (346) smaller than the height (345) of the center loop (245).

3. The system of claim 2, wherein the connection arm (246) has an upper edge (246a) and a lower edge (246b), wherein the center loop has an upper edge (245a) and a lower edge (245b), wherein the upper edge (246a) of each connection arm is lower than the upper edge (245a) of the center loop (245), wherein the lower edge (246b) of each connection arm is lower than the lower edge (245b) of the center loop (245).

* * * * *